US012769996B2

(12) United States Patent
Cai et al.

(10) Patent No.: US 12,769,996 B2
(45) Date of Patent: Oct. 20, 2026

(54) NEURAL NETWORK BASED PREDICTION OF EVENTS ASSOCIATED WITH USERS

(71) Applicant: Humana Inc., Louisville, KY (US)

(72) Inventors: Yunliang Cai, Lexington, MA (US); Peyman Yousefian, Frederick, MD (US)

(73) Assignee: Humana Inc., Louisville, KY (US)

( * ) Notice: Subject to any disclaimer, the term of this patent is extended or adjusted under 35 U.S.C. 154(b) by 1068 days.

(21) Appl. No.: 17/322,740

(22) Filed: May 17, 2021

(65) Prior Publication Data

US 2022/0366237 A1 Nov. 17, 2022

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC .......... G06N 3/08; G06N 3/04; G06N 3/0895; G06N 3/0455
See application file for complete search history.

(56) References Cited

U.S. PATENT DOCUMENTS 11,037,060 B2 * 6/2021 Nguyen et al.
11,222,094 B1 * 1/2022 Walton .................. G16H 30/40
11,431,663 B2 * 8/2022 Zhang .................. H04L 51/226
2015/0094544 A1 * 4/2015 Spolin et al.
2018/0082206 A1 * 3/2018 Yang et al.
2018/0322947 A1 * 11/2018 Potts ...................... G16H 40/20
2019/0385055 A1 * 12/2019 Sim
2020/0012918 A1 * 1/2020 Malhotra et al.
2020/0380365 A1 * 12/2020 Karino
2022/0121191 A1 * 4/2022 Togawa

OTHER PUBLICATIONS

Sun, F., Liu, J., Wu, J., Pei, C., Lin, X., Ou, W., & Jiang, P. (Nov. 2019). BERT4Rec: Sequential recommendation with bidirectional encoder representations from transformer. In Proceedings of the 28th ACM international conference on information and knowledge management (pp. 1441-1450). (Year: 2019).*

(Continued)

*Primary Examiner* — Usmaan Saeed
*Assistant Examiner* — Hyungjun B Yi
(74) *Attorney, Agent, or Firm* — Standley Law Group LLP; Jeffrey S. Standley; James L. Kwak

(57) ABSTRACT

A system trains a neural network for predicting time for communicating with users. The system trains the neural network using user data for users that includes a communication time series and an event time series. The system trains the neural network by masking a portion of the time series data and provides the masked time series data as input to the neural network. The system executes the neural network to predict values of the masked portion of the time series data. The system determines a loss value based on the accuracy of the prediction of the masked portion of the time series data and adjusts parameters of the neural network to minimize the loss value. The system uses the trained neural network to predict timing for communicating with a particular user.

17 Claims, 8 Drawing Sheets

(56) References Cited

OTHER PUBLICATIONS

Collin, A. S., & De Vleeschouwer, C. (Jan. 2021). Improved anomaly detection by training an autoencoder with skip connections on images corrupted with stain-shaped noise. In 2020 25th International Conference on Pattern Recognition (ICPR) (pp. 7915-7922). IEEE. (Year: 2021).*

Kieu, T., Yang, B., Guo, C., & Jensen, C. S. (Aug. 2019). Outlier detection for time series with recurrent autoencoder ensembles. In Ijcai (pp. 2725-2732). (Year: 2019).*

Cheng, H. T., Koc, L., Harmsen, J., Shaked, T., Chandra, T., Aradhye, H., . . . & Shah, H. (Sep. 2016). Wide & deep learning for recommender systems. In Proceedings of the 1st workshop on deep learning for recommender systems (pp. 7-10). (Year: 2016).*

Wang, H., Wang, N., & Yeung, D. Y. (Aug. 2015). Collaborative deep learning for recommender systems. In Proceedings of the 21th ACM SIGKDD international conference on knowledge discovery and data mining (pp. 1235-1244). (Year: 2015).*

Wen, R., Torkkola, K., Narayanaswamy, B., & Madeka, D. (2017). A multi-horizon quantile recurrent forecaster. arXiv preprint arXiv: 1711.11053. (Year: 2017).*

Lim, B., Arik, S. O., Loeff, N., & Pfister, T. (2019). Temporal Fusion Transformers for Interpretable Multi-horizon Time Series Forecasting, arXiv: 1912.09363 (Year: 2019).*

Galozy, A., & Nowaczyk, S. (2020). Prediction and pattern analysis of medication refill adherence through electronic health records and dispensation data. Journal of Biomedical Informatics, 112, 100075. (Year: 2020).*

Salinas, D., Flunkert, V., Gasthaus, J., & Januschowski, T. (2020). DeepAR: Probabilistic forecasting with autoregressive recurrent networks. International journal of forecasting, 36(3), 1181-1191. (Year: 2020).*

Germain, M et al., "MADE: Masked Autoencoder for Distribution Estimation," Proceedings of the 32nd International Conference on Machine Learning, Jun. 5, 2015, pp. 1-9.

Keng, B., "Autoregressive Autoencoders," Oct. 14, 2017, pp. 1-6, [Online] [Retrieved on Nov. 15, 2021] Retrieved from the Internet <URL: https://bjlkeng.github.io/posts/autoregressive-autoencoders/ >.

Vink, R., "Distribution estimation with Masked Autoencoders," Oct. 25, 2019, pp. 1-13, [Online] [Retrieved on Nov. 15, 2021] Retrieved from the Internet <URL: https://www.ritchievink.com/blog/2019/10/25/distribution-estimation-with-masked-autoencoders/ >.

* cited by examiner

NEURAL NETWORK BASED PREDICTION OF EVENTS ASSOCIATED WITH USERS

BACKGROUND

The disclosure relates to machine learning based models for prediction of events in general and more specifically to neural network based models for prediction of events associated with users.

Organizations perform interactions with users on a regular basis. Such interactions may be performed using various communication mechanisms such as SMS text, automated phone calls, live agent calls, and so on. A communication mechanism may also be referred to as a communication channel. Different communication mechanisms have different resource utilization. Accordingly, certain communication mechanisms utilize more resources than others. An organization may have to communicate with a large number of users and typically does not have sufficient resources to reach out to all users within reasonable time. Furthermore, depending on the goals that the organization wants to achieve, it may be more important for the organization to prioritize reaching out to some users over other users. Furthermore, different users respond differently to different modes of communication. Accordingly, the rate of user response depends on the communication mechanism used to interact with the users.

Organizations often use simple rule-based heuristics for determining how to communicate with users. These heuristics may determine the communication mechanism used to interact with the users and the timing of the communication. These heuristics may use broad categorizations of users and are not personalized to specific user's conditions and behavior. Furthermore, these rule-based techniques lack quantitative measures to monitor efficiency of the communication mechanisms, thereby making the process difficult to adapt to continuously changing data. As a result, the communications performed with users do not utilize the communication resources effectively. Furthermore, use of incorrect communication mechanism to communicate with users resulting in lower rate of user response. This results in waste of communication and computational resources. Furthermore, the organization fails to reach the target goal that the organization was attempting to reach by communicating with the users.

SUMMARY

A system according to an embodiment trains a neural network for use in predicting time for communicating with users. The system receives a training dataset for training the neural network. The training dataset includes user data for users. The user data for a user includes a communication time series and an event time series. The communication time series represents communications sent to the user and the event time series represents events associated with the user.

The system trains the neural network by repeatedly performing following steps. The system identifies a user having data stored in training dataset. The system extracts time series data including a communication time series and an event time series for the user. The communication time series may include various communications including interventions performed with a user requesting the user to perform certain actions. The system masks a portion of the time series data and provides the masked time series data as input to the neural network. The system executes the neural network to predict values of the masked portion of the time series data. The system determines a loss value based on the accuracy of the prediction of the masked portion of the time series data and adjusts parameters of the neural network to minimize the loss value.

The system uses the trained neural network to predict timing for communicating with a particular user. The system receives an event time series for the user and executes the neural network to determine a time of an event in future. The system determines a time for sending a communication to the user based on the time of the event. The system sends a communication to the user at the determined time.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Organizations may use various communication channels for communicating with users, for example, text messaging, automated voice calls, agent assisted calls, and so on. There are costs associated with using a particular communication mechanism. The organization communicates with the user is to elicit certain user response from the user, for example, by performing an expected user action. The timing of the communication is significant in determining whether a user performs the expected user action. For example, if the message is sent too soon or too late, the user may not respond. As a result, the communication sent to the user is wasted and there is a possibility that the user may not respond unless the organization sends a follow up communication. Therefore, accurate timing of communications may have significant impact on the likelihood of users responding. Furthermore, since communicating with users takes up resources including communication resources, computing resources, and people resources, inaccurate timing of communications with users results in waste of these resources.

Embodiments use neural networks to predict accurate timing for communicating with the user so as to maximize the likelihood of the user responding. As a result, the organization is able to increase the overall user response rate across the users as well as improve the utilization of resources involved in communicating with users including communication resources, computing resources, and people resources.

Overall System Environment

Figure 1:
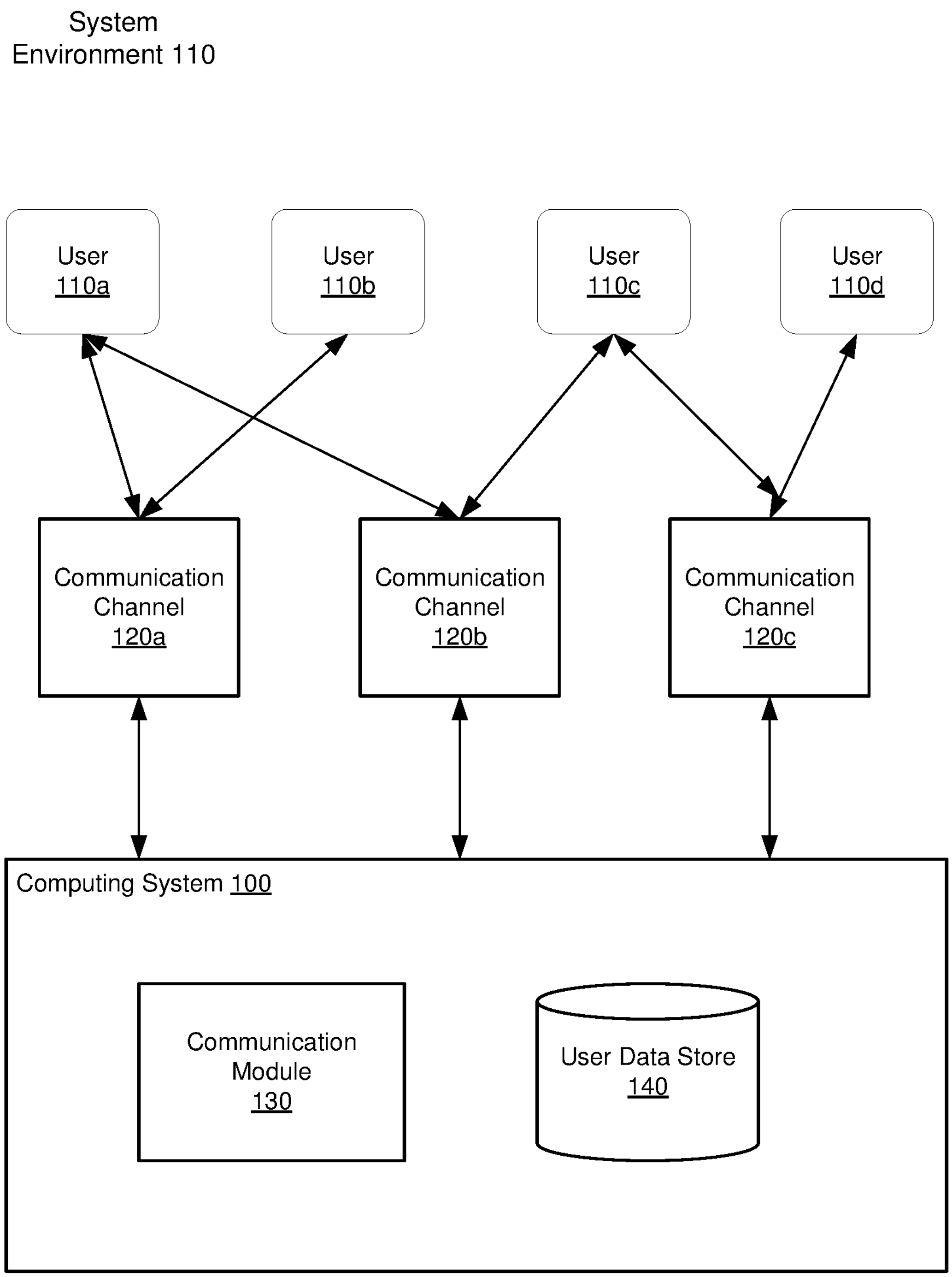
FIG. 1 shows the system environment of a system configured to communicate with users to invoke responses from the users, according to an embodiment.

FIG. 1 shows the system environment of a system configured to communicate with users to invoke responses from the users, according to an embodiment. The system environment 110 includes a computing system 100 that can communicate with users 110 using communication channels 120. In other embodiments, more or fewer systems/components than those indicated in FIG. 1 may be used. Furthermore, there may be more or less instances of each system shown in FIG. 1, such as the communication channels 120. The computing system 100 includes a communication module 130 and a user data store 140. Other embodiments of the computing system 100 may include more or fewer modules.

The user data store 140 stores information describing users. The data stored in the user data store 140 for a particular user includes user profile data as well as time series data associated with the user. The user data store 140 may store demographic data describing the user including age, gender, and so on. The user data may store other attributes of a user, for example, member behavior preference, activity preference, or billing preferences.

User attributes may represent values that are specific to a domain for which the computing system 100 is used. For example, if the computing system is used for managing health care information for users, the user data store 140 may store health care profiles for the users including any relevant medical conditions of the user. Although several examples are presented based on a healthcare domain, the techniques disclosed are not limited to health care domain and can be applied to other domains in which an organization or a system needs to communicate with users. For example, if the organization represents a business and the user represents a customer of the business, the user data store may include past purchases by the user, financial status, location, and so on.

Certain attributes of the user profile are indicative of an urgency by which the organization needs to communicate with the user. For example, if the computing system is used by an organization managing health care information for users, a user attribute may represent medical condition of the user, for example, hyperlipidemia, hypertension, diabetes, or other condition. The medical condition is associated with a measure of urgency or a measure of significance of communicating with the user within a threshold time interval. For example, the user may have immediate health risk if the user is not reached for picking up medication that is prepared for the user and is ready for pickup.

An attribute of the user stored in the user profile is the medical adherence level of the user that represents a degree to which a patient correctly follows medical advice and takes medication prepared for the user. In an embodiment, the medical adherence of the user is indicated by a measure called the percentage days covered (PDC). The measure PDC represents the percentage of days (or the fraction of number of days) in an interval when the medication was available to the user. The PDC may be measured as a ratio of the number of days that the user was covered (i.e., the user was determined to be in in possession of medication) and the number or days that the user was eligible to take medication (i.e., including the days that the medication was prepared and available at a pharmacy that the user was eligible to pick up but may not have picked up). If the user is out of supply of the medication and the user has not picked up new medication supply from the pharmacy, there is a gap in the user's medication. These are referred to as gap days. The user profile may store information describing the gap days of the user. If the computing system is used for reaching customers of a business, the user profile store 140 may store the type of products/services that the customer has received in the past as well as interests of the user.

The user data store 140 includes time series data associated with the user. The time series data associated with the user includes (1) communication time series data and (2) event time series data. The communication time series data includes instances of communications performed by the organization or the system with the user. The communication module 130 may perform communications with a user using any of the communication channel. The user data store 140 stores a time series representing the communications performed with the users and the corresponding timestamps at which the communication was performed. A communication may represent an intervention performed for a user to inform the user about medication that the user needs to pick up from a pharmacy. The communication time series may be represented as a binary time series. Accordingly, the communication time series is represented using binary values, i.e., the value for a date (or a timestamp) is one if a communication was sent to the user on that day or else the communication time series value is zero.

The event time series data represents events associated with the user. Event time series is also referred to as behavior time series, since the user behavior determines the events associated with the user. In an embodiment, the events represent health care events associated with the user. As an example, an event may indicate that the user picked up medication from a pharmacy. The event time series represents timestamps associated with events associated with the user. The timestamp may be represented as a data, for example, the date when a user picks up the medication from a pharmacy. In an embodiment, the event time series is represented using binary data, for example, a value of 1 for a date indicates that the user had mediation and a value of 0 indicates that the user does not have medication. Accordingly, the event time series represents values of an attribute describing the user, the attribute associated with an event. If the attribute value if greater than a threshold, the event time series has a value V1 for a timestamp (or date) and the event time series has a value V2 otherwise. If the user attribute has binary values, the event time series may use the binary values of the user attribute at each time point.

The user data store may represent event duration using a binary time series. For example, the event time series data may represent the last day for an event to finish, for example, the last day on hand (LDOH) event indicating that the user runs out of medication on that day unless the user picks up medication. Accordingly, the event time series value for a day has value one if the day represents an LDOH event and a value zero otherwise.

The computing system according to an embodiment, performs: 1) identification and prioritization of users who need outreach to improve their medical adherence, 2) recommending the type of communication with the user that is determined to be optimal in terms or resources as well as the likelihood of reaching the user, and a time of performing the communication to improve member's medical adherence level. The computing system receives user profile data, for example, user's healthcare profile data, users historical refill, and outreach data. The system performs a series of machine learning computations to determine an output comprising: (1) a list of members with identified PDC levels with whom the system needs to communicate within a threshold time interval, and (2) the type of communication channels used to communicate with the identified users and (3) the time when the system should communicate, for example, the dates when the system should reach out to the identified users.

Examples of communication channels 120 include messaging platforms such as SMS text, automated phone calls, live agent calls, using a third-party system to reach a user, and so on. The communication module 130 includes instructions for communicating with a user using any of the communication channels.

The users perform certain user actions in response to the communication received by the user via a communication channel. These are target user actions that the organization maintaining the computing system 100 expects the users to perform. For example, if the organization if a pharmacy that performs outreach to patients to pick up medication, the expected user action is the user picking up the medication. If the organization is a business enterprise, the expected user action may be, the user purchasing an item or performing an interaction associated with an item, for example, requesting additional material describing the item, registering with a website associated with the organization, recommending the item to another user, filling out a survey related to the item, and so on.

The communication module 130 uses machine learning techniques to determine the optimal timing for communicating with a user to maximize the likelihood that the user will perform an expected user action. Further details of the communication module 130 are described herein, for example, in connection with FIG. 2.

Typically, the computing system 100 performs repeated communications with each user over time and also monitors the user actions over time. As a result, the computing system stores a time series representing the communications performed with each user and also one or more time series representing the user actions as they occur. The information is stored as a time series since each data point representing either a communication or a user action is associated with a timestamp value. Accordingly, the time series data may be stored as pairs (t, v) where t is a timestamp value and v is a data value. The time series information may be stored in the user profile data store 150 or in a separate time series data store that is linked to the user profile data store 150.

FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

System Architecture

Figure 2:
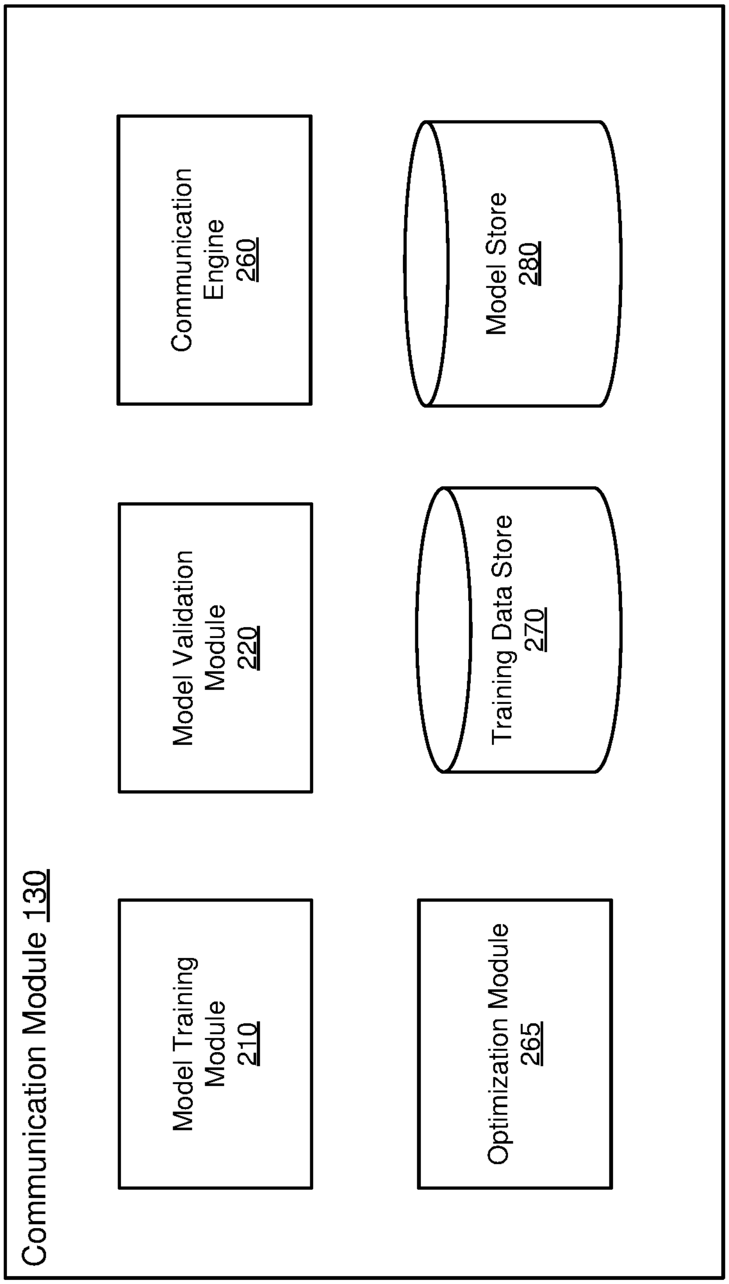
FIG. 2 shows the system architecture of the communication channel selection module, according to an embodiment.

FIG. 2 shows the system architecture of the communication module 130, according to an embodiment. The communication module 130 includes a model training module 210, a model validation module 220, a time series correlation module 230, a communication channel selection module 240, a training data generation module 250, a user prioritization module 255, a communication engine 260, an optimization module 265, a training data store 270, and a model store 280. Other embodiments may include other modules. Actions indicated as being performed by a particular module may be performed by other modules than those indicated herein.

The communication module 130 trains and executes a machine learning based model such as a neural network to predict the timing of the communications sent to the users. In an embodiment, the machine learning based model is an autoencoder neural network model. In an embodiment, the neural network is configured to predict dates for upcoming events for the user, given the users behavior record and past intervention history as input. The behavior record is represented as an event time series and the intervention history is represented as a communication time series.

The model training module 210 trains the neural network using training dataset based on user data for a set of users. The training data generation module 250 invokes the time series analysis module 230 to analyze time series data representing past instances of communication by the computing system 100 with a user and user interaction data from that user.

A model trained by the model training module 210 is validated by the model validation module 220. A model that is successfully validated is used by the communication channel selection module 240 for determining the communication channel that is most likely to be effective for a particular user. A machine learning based model that fails validation may be retrained using additional training data and the process repeated until the model passes validation.

The neural network is stored in the model store 280. A neural network comprises a set of parameters that are stored in the model store 280. The parameters of a neural network are adjusted using the training data during the training phase of the neural network. The parameters of the neural network are processed by the communication timing selection module 240.

The communication engine 260 includes the instructions for interfacing with the various communication channels. The communication engine 260 sends the communication at the time selected based on the neural network prediction. The communication engine 260 invokes the right application programming interface (API) for a communication channel to send a message to the user using a particular communication channel. If the effective communication channel is selected to be an automatic voice bases channel, the communication engine 260 invokes the right API to construct the audio signal and send as an automatic voice message to the user.

Figure 3A:
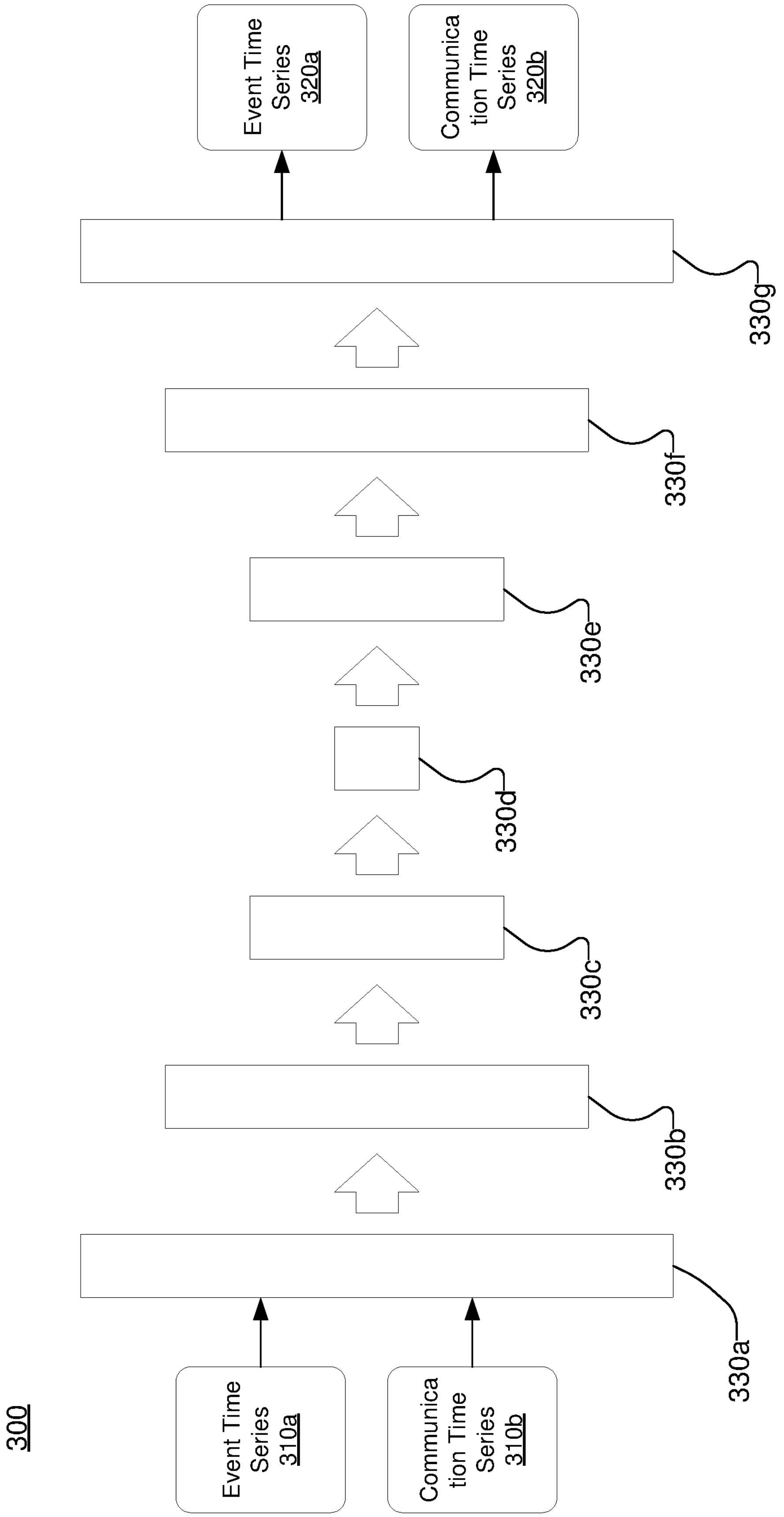
FIGS. 3A-B show example architectures for a neural network for predicting time series data for users, according to an embodiment.
Figure 3B:
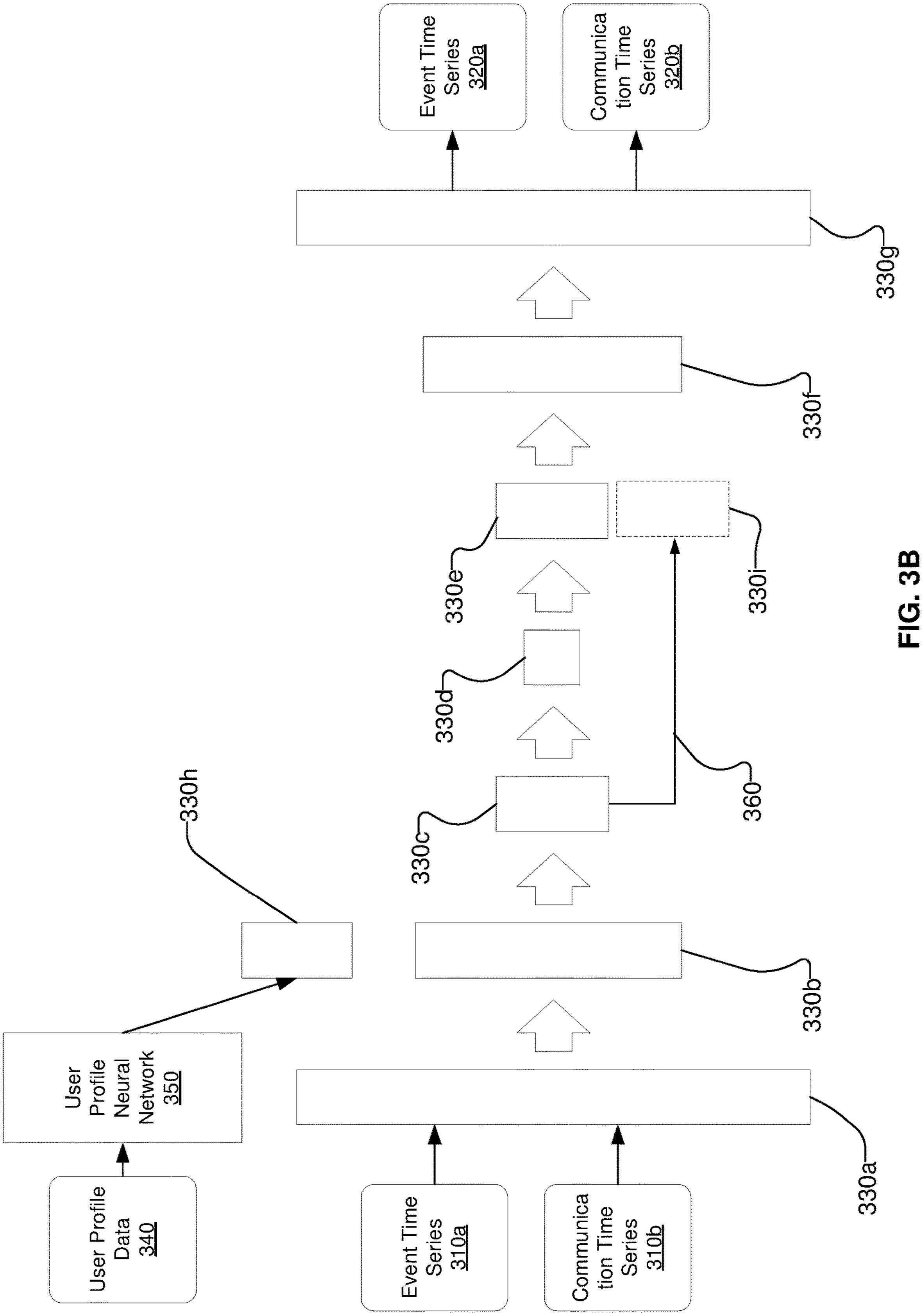

FIGS. 3A-B show example architectures for a neural network 300 for predicting events for users, according to an embodiment. According to an embodiment, the neural network 300 is an auto encoder that takes as input, time series data and encodes it to generate a feature vector representation of the time series data. The feature vector representation is the output of a hidden layer of the neural network processing the time series as input. The neural network 300 further processes the feature vector representation of the time series data to reconstruct the input time series data. In an embodiment, the time series data for a user input to the neural network 300 includes (1) event time series data 310 for the user and (2) communication time series data 320 for the user.

The neural network 300 comprises multiple layers 330. The input time series data 310 is provided as input to the input layer 330*a*. The neural network forms a sequence of layers such that an output of a layer may be provided as an input to a subsequent layer. Accordingly, a layer may receive input from a previous layer of the neural network, process the received values and output the result to a subsequent layer of the neural network. For example, layer 330*b* receives input from previous layer 330*a* and outputs the result to the layer 330*c*, layer 330*c* receives input from previous layer 330*b* and outputs the result to the layer 330*d*, layer 330*d* receives input from previous layer 330*c* and outputs the result to the layer 330*e*, and so on. Each layer generates a representation of the input time series data.

The representation output by layer 330*b* has fewer values than the representation output by layer 330*a*. Similarly, the representation output by layer 330*c* has fewer values than the representation output by layer 330*b* and the representation output by layer 330*d* has fewer values than the representation output by layer 330*c*. Accordingly, the first few layers of the neural network compress the feature vector representation of the input time series to generate an encoded representation of the input time series that is compressed and can be represented using fewer values than the input time series.

The subsequent layers 330*e*, 330*f*, and 330*g* decode the encoded representation of the input time series data that is output by the layer 330*d*. The outputs generated by the layers 330*e*, 330*f*, and 330*g* are increasing in number of elements. Accordingly, the representation output by layer 330*e* has more values than the representation output by layer 330*d*, the representation output by layer 330*f* has more values than the representation output by layer 330*e*, and the representation output by layer 330*g* has more values than the representation output by layer 330*f*. The last layer 330*g* is configured to output a representation 320 that matches the input time series data 310. Accordingly, the neural network 300 encodes the input time series data to a compressed representation and then decodes or uncompresses the compressed representation to generate output 320 that reconstructs the input time series data 310.

The input time series data corresponds to a time interval, for example, communications or events for a user that occurred in a year. The neural network 300 is executed to reconstruct a portion of a time series that represents the end of the time interval. Accordingly, the neural network 300 may be used to predict the portion of the time series that occurs in future. Accordingly, the neural network 300 may be used to predict user events that may occur in future. For example, if a user event represents an attribute of a user indicating whether the user has medication, the neural network 300 may be used to predict gap periods for the user when the user is without medication. The predicted gap periods are used to determine the time for sending communications to the user, for example, interventions that inform or request the user to pick up medication. The communications may be timed such that the communication is sent within a threshold time interval of a predicted gap period. Timing the communications based on predictions of gap periods for a user increase the likelihood of the user responding to the communication. In general, a user is more likely to respond if the user is contacted before a predicted gap period indicating the time period when user is expected to run out of medication.

FIG. 3B shows a configuration of the autoencoder that uses user profile data as input. Accordingly, a user profile neural network 350 is used to generate a feature vector based on the user profile. In an embodiment, the user profile network is used to receive user profile data as input and make a prediction based on the user profile data. An embedding representing an output of a hidden layer of the user profile neural network 350 is used as a feature vector for the user profile data. The output feature vector generated by the user profile neural network 350 is provided as input to the neural network 300. For example, the user profile feature vector representation 330*h* is combined with the time series feature vector representation 330*b*. The combined feature vector representation is provided as input to the subsequent layers of the neural network 300. As a result, the neural network 300 incorporates the user profile data when reconstructing the time series data, thereby making more accurate predictions for the event series data that are personalized to the user.

FIG. 3B further illustrates jump paths 360 that are used to make the neural network computation efficient. As shown, the output of a layer 330*c* may be provided to a subsequent layer that is not adjacent to the layer 330*c*. Accordingly, the output of a layer 330*c* is provided to a layer 330*f* that is separated from the layer 330*c* by at least one other layer 330*d*, 330*e*. This configuration allows the neural network to skip some of the layers, thereby making the neural network computation efficient. The output of the layer 330*c* is concatenated with the output of the layer 330*e* and provided as input to the layer 330*f*. Accordingly, the layer 330*f* processes the output of layer 330*e* as well as the output of layer 330*c*. The neural network configuration with jump paths includes at least a layer 330*f* that processes input from a previous layer 330*e* that is adjacent to the layer 330*e* and another layer 330*c* such that there is at least one more layer 330*d*, 330*e* between the layers 330*f* and the layer 330*c*. The inclusion of jump paths trains the neural network to determine whether one or more hidden layer computations can be bypassed. This results is faster convergence of the neural network during training.

Process

The neural network 300 is trained using historical data. Certain portions of the communication time series and/or the event time series are masked before providing them as input to the neural network for training. The neural network reconstructs the time series and determines the actual values of the time points that were masked. The predicted values are compared with the actual values of the time series before the values were masked to determine a loss value for the reconstruction by the neural network. The weights (i.e., parameters) of the neural network 300 are adjusted during the training to minimize the loss values.

Figure 4:
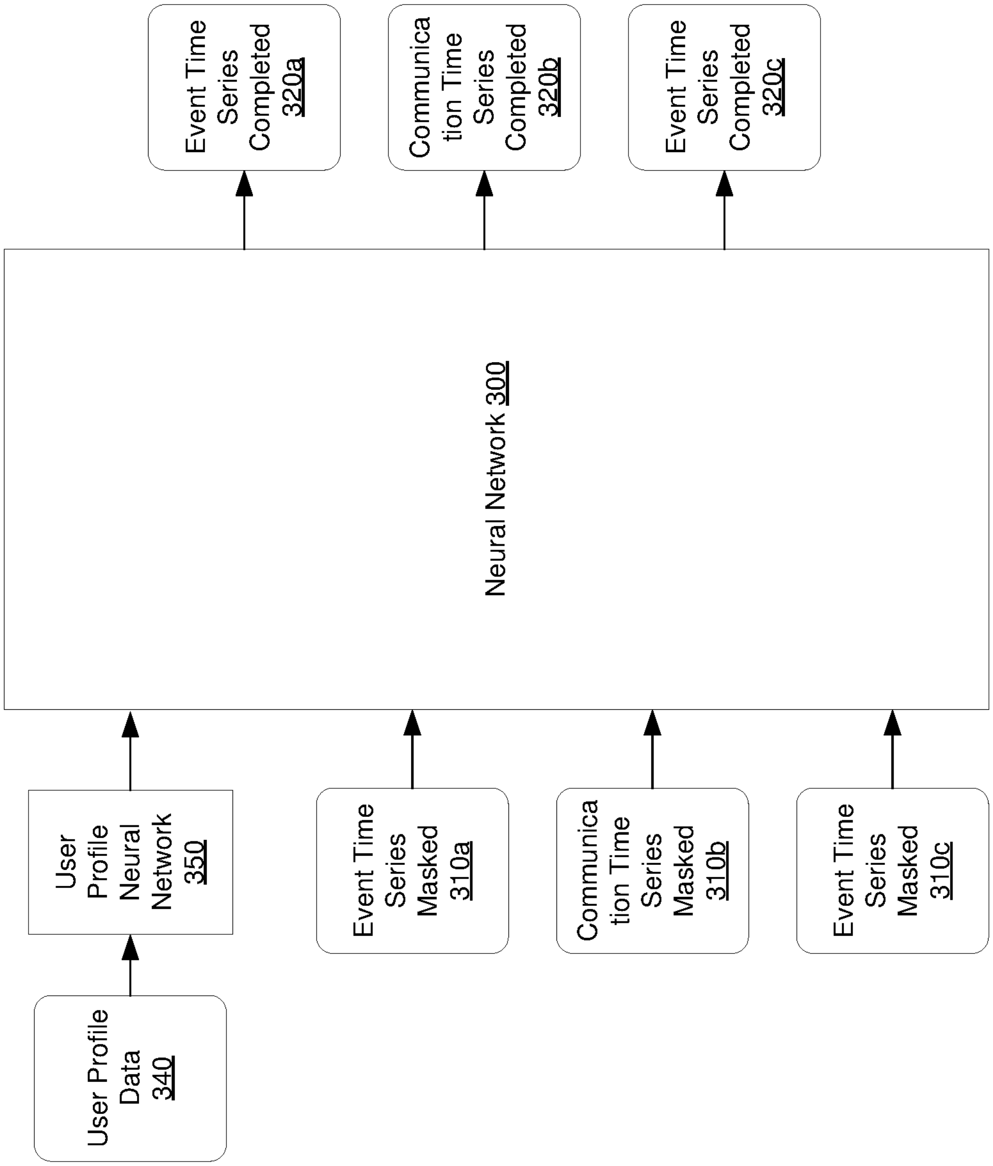
FIG. 4 shows the inputs and outputs of the neural network during training of the neural network, according to an embodiment.

FIG. 4 shows the inputs and outputs of the neural network during training of the neural network according to an embodiment. In the embodiment shown in FIG. 4, the neural network receives following time series data as input: (1) event time series 310*a* for a time interval (e.g., a year) with the event data for a portion of the time interval removed (e.g., the event data for the last event of the time interval removed), (2) a communication time series 310*b*, and (3) the event time series 310*c* for the portion of the time series that was removed from event time series 310*a*. Accordingly, the event time series is split into two event time series, the event time series 310*a* with a portion of the time series removed from the end of the time interval and the event time series 310*b* that includes the portion of the event time series that was removed.

Some or all of the input time series 310*a*, 310*b*, and 310*c* may include masked portions. If the input time series 310 are represented as binary time series, the masking of a portion of the time series is performed by replacing values of the time series data in that portion to be zero. In another embodiment, the masking of a portion of the time series is performed by replacing values of the time series data in that portion with random values.

The output of the neural network 300 reconstructs the three time series that are input to the neural network 300 and includes (1) completed event time series 320*a* that reconstructs the input event time series 310*a* (2) completed communication time series 310*b* that reconstructs the input communication time series 310*b*, and (3) completed event time series 310*c* that reconstructs the input event time series 310*c*. Separating the even time series into two separate time series as described above improves the accuracy of prediction of the neural network 300.

Figure 5:
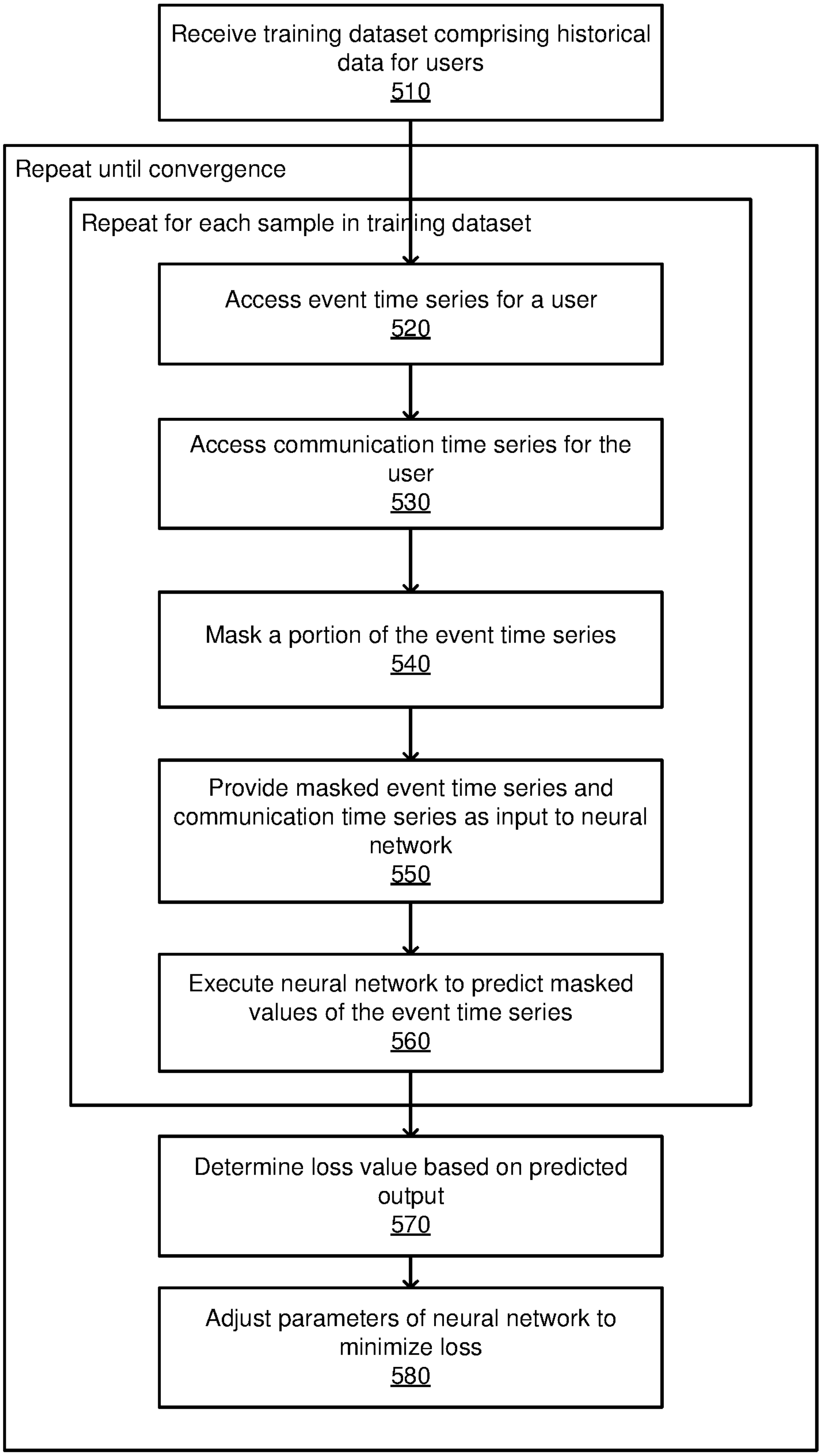
FIG. 5 shows a flowchart illustrating the process for training a neural network for predicting events for a user, according to an embodiment.
Figure 6:
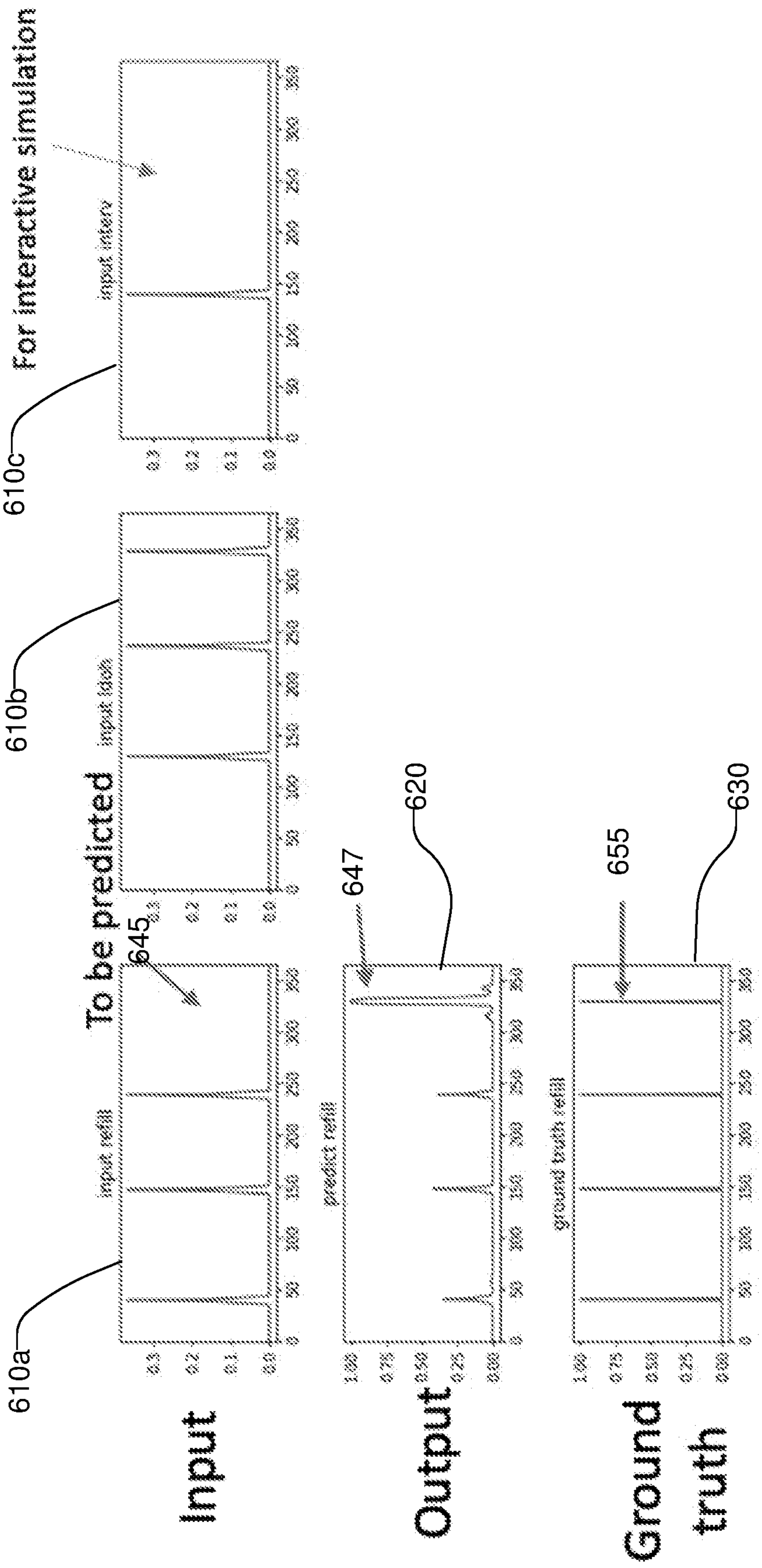
FIG. 6 shows exemplary data that is used for training the neural network, according to an embodiment.

FIGS. 5 and 6 illustrate various processes for training and executing machine learning based models for determining communicating channels for communicating with users according to various embodiments. The steps described herein for a process may be performed by modules other than those described herein. Furthermore, the steps may be performed in an order different from that shown herein, for example, certain steps may be performed in parallel. The steps of the process may be executed by the communication module 130 or by other modules. The following description indicates the steps being executed by the computing system 100, also referred to as the system.

FIG. 5 shows a flowchart illustrating the process for training a neural network for predicting events for a user, according to an embodiment. The system receives 510 a training dataset based on historical information available. The training dataset includes data for multiple users including (1) the user profile data including the health care profile of the user if applicable, (2) the communication time series data for the user describing the communications that were sent to the user, for example, in the past year or multiple years, (3) the event time series data for the user describing the events for the user including the days that the user had medication or identifying the last days on hand for user representing the days when the user ran out of medication.

The system performs training of the neural network until convergence, for example, until a loss value reaches below a threshold value. The training process repeats the steps 520, 530, 540, 550, and 560 for each user from a set of users in the training dataset. The system accesses 520 the event time series data for the user. The system accesses 530 the communication time series data for the user. The system masks at least a portion of one or both of the event time series and the communication time series. The system provides 550 the masked time series data as input to the neural network. The system executes 560 the neural network with the provided input to predict the masked values of the input time series.

The system determines 570 a loss value representing a difference between the predicted values of the masked portions of the time series and the actual values of the time series data before the masking. The loss value may be referred to as a reconstruction loss representing the loss of information by reconstructing the input time series using the autoencoder neural network. The system adjusts 580 the parameters of the neural network to minimize the loss value. The above steps of training are repeated until some convergence criteria is met indicating that the loss value is below a threshold.

FIG. 6 shows exemplary data that is used for training the neural network, according to an embodiment. The charts illustrated in FIG. 5 show the time series data visualized, for example, as charts presented via a user interface. The charts 610 show the inputs that are provided to the neural network 300 for training. The chart 610*a* shows an event time series representing the event indicating a refill of a medication for a user. A portion 645 of the time series is masked by setting the in that portion of the time series values to zero. The chart 610*b* shows an input time series representing last day on hand event indicating the last day that the user has medication or the days that the user runs out of medication that was previously refilled. The chart 610*c* shows the communication time series identifying the various communications performed with the user, for example, interventions. The system may modify the values of the time series shown in chart 610*c* to perform simulation by observing the effect of changes to communication strategies, for example, by changing the communication times or communication mechanisms used for a user.

The chart 620 shows the output generated by the neural network. The chart 620 represents the output corresponding to the input shown in chart 610*a* and determines the values 647 for the masked portion 645. The chart 630 represents the event time series without masking, i.e., the event time series before the masking was performed on portion 645. Accordingly, chart 630 represents the ground truth. The system compares the predicted output as shown in chart 620 with the ground truth as shown in 630 to determine a loss value so that the parameters of the neural network can be adjusted to minimize the loss value. The parameters of the neural network are adjusted using a technique such as gradient descent.

Figure 7:
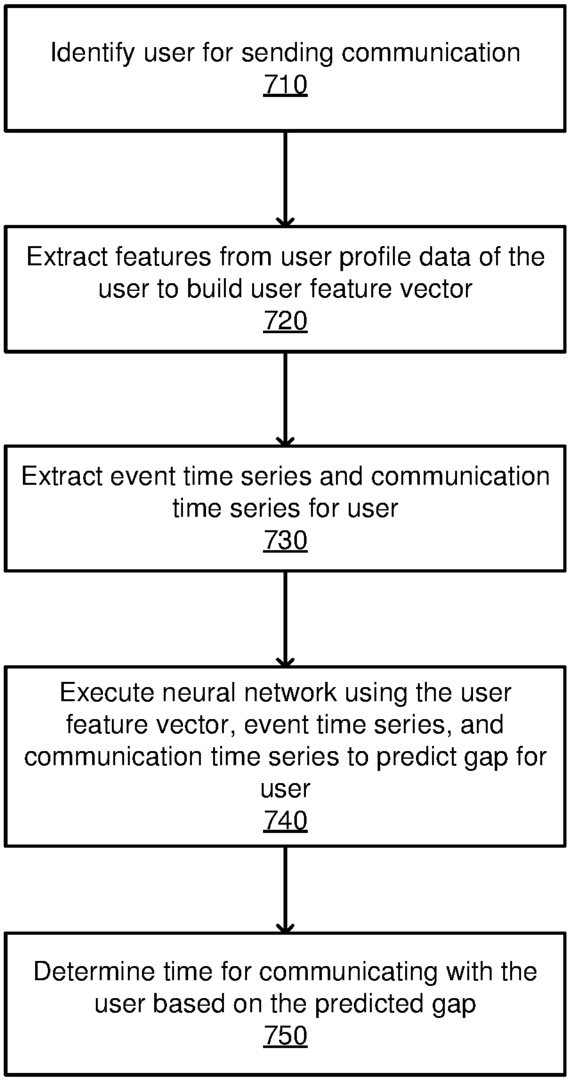
FIG. 7 shows a flowchart illustrating the process for determining timing for communicating with a user based on a neural network, according to an embodiment.

FIG. 7 shows a flowchart illustrating the process for determining timing for communicating with a user based on a neural network, according to an embodiment. Once the neural network 300 is trained, the neural network 300 can be used for predicting events for users, for example, for determining the gap days in future for a user. The gap days are used for determining when to send communications to user, for example, for intervention.

The system identifies 710 a user for sending communication. The system extracts 720 features from the user profile data for the user to build the user feature vector as shown in FIG. 3B. The system extracts 730 time series data including the event time series and communication time series from the user data. The system provides the user profile data and the time series data as input to the neural network 300 and executes 740 the neural network to predict events for the user in the future, for example, gap days for the user. The system determines 750 the time for sending communications to the user based on the predicted events of the future, for example, based on the predicted gap days. The system sends the communications according to the determined time.

In some embodiments, the system is used for performing simulation to determine optimal communication strategies for communicating with users. A user may interactively modify data of the communication time series to determine the results on the user. For example, a user may try various communication strategies, observe the impact on the user action and select the communication strategy that provides the optimal result.

Applications and Technological Improvements

Conventional techniques for determining the parameters of communications for reaching out to users are based on rigid rule-based techniques. These techniques are not customized to individual users. At best they may use broad categories of users and apply specific rules for each category. In contrast, the techniques disclosed for communicating with users according to various embodiments are optimized and personalized to individual users.

Another drawback of the rule base techniques is that they do not adapt to continuously changing data. For example, a user's behavior may change over time, but the rule based technique may continue to make the same prediction for the user since prediction is based on rigid and simplistic rules based on user characteristics that may not reflect the change in user behavior. To monitor the change in user behavior the system needs to analyze the time series data representing the user interactions, which is not performed by conventional rule-based systems.

An alternative to rule-based systems is use of machine learning based techniques for making predictions. User interaction data are stored as time series data. Machine learning models are used for making predictions based on time series data. Examples of machine learning based models that may be used for analyzing time series data include recurrent neural networks, long short-term memory (LSTM) neural networks, and so on. Techniques such as recurrent neural networks process the time series data element by element to make predictions based on the data. As a result, the neural network computation is executed several times, once for each element of the time series data. This can be a computationally slow process for long time series and complex neural network computations. LSTM is an extension of recurrent neural networks and processed the time series data in the same manner as a recurrent neural network. Embodiments improve the computational efficiency of the processing of the time series data compared to systems such as those based on recurrent neural networks that are typically used for making predictions based on time series data. This is so because the time series data is processed as a feature vector rather than element by element. Accordingly, the machine learning computation is not executed individually for each element of the time series data, thereby improving the efficiency of computation.

Furthermore, training machine learning models for the time series data is challenging due to lack of labelled data. The information for a member may be labelled through manual inspection by determining whether the member is responsive to a particular communication channel. However, this is a tedious and error prone process. In contrast, the embodiments use masked time series data for training the machine learning models, thereby obviating the need for labelling of the training data. The ability to automate the process of generating the training data allows for generation of more training data that results in better trained machine learning models. Furthermore, the training data generated has high accuracy compared to manual labelling that is more error prone.

The techniques discussed herein may be used for various applications that require communications with users. As disclosed, healthcare providers may reach out to users to inform them of medications that they need to pick up. Accordingly, the techniques may be used by pharmacies for outreach of members under medical conditions (for example, diabetes) who are with medical refill gaps, thereby helping the pharmacy close the gaps. It is important for several member with specific medical conditions such as diabetes, to ensure that there are no medical refill gaps, to ensure they have adequate supply of the medication to avoid further complications to their medical conditions. Accordingly, health care provides reach out to the member to remind the member to pick up their medication.

The pharmacy or any healthcare provider may use various communication channels for reaching out to members including automatic voice call, live agent call such as clinician call, in-pharmacy intervention, intervention via a third-party company, for example, drug companies, and so on. The system predicts the optimal communication channel for reaching a particular member as well as the timing of the communication to increase a chance the chance member would be reached successfully and respond to the communication as a result.

Other applications that may use the techniques disclosed include organizations that may reach out to different users. For example, representatives of clients or sales departments that may reach out to customers or potential leads, publishers may reach out to subscribers, and so on. Use of the techniques ensures that the organization has a higher success rate in reaching the users and are able to receive better response from the users. The rate of user response typically affects the results that the organizations aim to achieve, for example, business.

Additional Considerations

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term “coupled” to indicate that two or more elements are in direct physical or electrical contact. The term “coupled,” however, may also mean that two or more elements are not in direct contact with each other, but yet still co-operate or interact with each other. The embodiments are not limited in this context.

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the “a” or “an” are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for determining time for sending communications to users, comprising:

receiving training dataset for training a neural network, the training dataset comprising user data for a plurality of users, the user data for a user including a communication time series and an event time series, wherein the communication time series represents communications sent to the user and the event time series represents events associated with the user;

training the neural network comprising, repeatedly:

identifying a user having data stored in the training dataset;

extracting time series data comprising a communication time series and an event time series for the user having data stored in the training dataset;

masking or removing a portion of the time series data;

responsive to masking or removing the portion of the time series data, providing the time series data as input to the neural network;

executing the neural network to predict values of the masked or removed portion of the time series data;

determining a loss value based on the accuracy of the prediction of the masked or removed portion of the time series data; and adjusting parameters of the neural network to minimize the loss value;

executing the trained neural network with time series data for a particular user to predict an event for the particular user in the future;

determining a timing for communicating with the particular user based on the predicted event for the particular user in the future, and wherein the predicted event for the particular user relates to predicted gap days in medication;

sending a communication to the particular user based on the timing for communicating determined based on the predicted gap days for the particular user in the future, the communication informing the particular user to pick up medication;

wherein, during training, the user having data stored in the training dataset is associated with a first event time series representing events associated with the user that occurred in a time interval, and wherein the extracted event time series is a second event time series obtained by masking or removing a portion of the first event time series from an end of the time interval, wherein the input of the neural network further comprises a third event time series representing the portion of the first event time series masked or removed from the end of the time interval;

wherein during training, inputting into the neural network: i) a first communication time series associated with the user having data stored in the training dataset, ii.) the second event time series obtained by masking or removing a portion of the first event time series from an end of the time interval, and iii.) the third event time series representing the portion of the first event time series masked or removed from the end of the time interval, and wherein the neural network is trained to reconstruct the masked or removed portion by minimizing the loss value; and wherein the neural network is a first neural network, the method further comprising: accessing user profile data for the particular user; providing the user profile data as input to a second neural network; executing the second neural network to generate a user profile feature vector; and providing the user profile feature vector as input to the first neural network, wherein the user profile feature vector is combined with a time series feature vector representation at an intermediate layer of the first neural network to generate personalized predictions for the particular user.

2. The computer-implemented method of claim 1, wherein the second neural network comprises a multi-layer architecture configured to encode user profile data including demographic data, health care profile data, and user preferences into the user profile feature vector, and wherein the user profile feature vector is concatenated with the time series feature vector at intermediate layer of the first neural network, to enable the first neural network to generate predictions personalized to the characteristics and preferences of the particular user.

3. The computer-implemented method of claim 2, wherein the first neural network comprises an autoencoder with skip connections configured to encode the time series data into a compressed feature vector and decode to reconstruct the masked or removed portions, and wherein the user profile feature vector produced by the second neural network is concatenated into an intermediate layer of the first neural network for personalized prediction.

4. The computer-implemented method of claim 1, wherein the neural network is an autoencoder.

5. The computer-implemented method of claim 1, wherein the neural network encodes the time series data to the time series feature vector representation, the time series feature vector representation being smaller than the time series data, and decodes the time series feature vector representation to reconstruct the time series data.

6. The computer-implemented method of claim 1, wherein the neural network includes a path that skips a layer, such that an output of a first layer is provided as input to a second layer, wherein there is at least a third layer between the first layer and the second layer.

7. The computer-implemented method of claim 1, wherein the step of training the neural network further includes the step of: dynamically adjusting neural network weights using feedback on predictive accuracy of masked time series portions.

8. The computer-implemented method of claim 1, further including the steps of: implementing a neural network model with skip connections to enable efficient prediction of masked portions of time series data; and wherein the skip connections enable concurrent feature extraction from multiple time series resolutions.

9. A non-transitory computer readable storage medium storing instructions that when executed by a computer processor, cause the processor to perform steps comprising:

receiving training dataset for training a neural network, the training dataset comprising user data for a plurality of users, the user data for a user including a communication time series and an event time series, wherein the communication time series represents communications sent to the user and the event time series represents events associated with the user;

training the neural network comprising, repeatedly:

identifying a user having data stored in the training dataset;

extracting time series data comprising a communication time series and an event time series for the user having data stored in the training dataset;

masking or removing a portion of the time series data;

responsive to masking or removing the portion of the time series data, providing the time series data as input to the neural network;

executing the neural network to predict values of the masked or removed portion of the time series data;

determining a loss value based on the accuracy of the prediction of the masked or removed portion of the time series data; and adjusting parameters of the neural network to minimize the loss value;

executing the trained neural network with time series data for a particular user to predict an event for the particular user in the future;

determining a timing for communicating with the particular user based on the predicted event for the particular user in the future, and wherein the predicted event for the particular user relates to predicted gap days in medication;

sending a communication to the particular user based on the timing for communicating determined based on the predicted gap days for the particular user in the future, the communication informing the particular user to pick up medication;

wherein, during training, the user having data stored in the training dataset is associated with a first event time series representing events associated with the user that occurred in a time interval, and wherein the extracted event time series is a second event time series obtained by masking or removing a portion of the first event time series from an end of the time interval, wherein the input of the neural network further comprises a third event time series representing the portion of the first event time series masked or removed from the end of the time interval; and wherein during training, inputting into the neural network: i) a first communication time series associated with the user having data stored in the training dataset, ii.) the second event time series obtained by masking or removing a portion of the first event time series from an end of the time interval, and iii.) the third event time series representing the portion of the first event time series masked or removed from the end of the time interval, and wherein the neural network is trained to reconstruct the masked or removed portion by minimizing the loss value;

wherein the neural network is a first neural network, the instructions when executed by a computer processor, cause the processor to perform steps comprising: accessing user profile data for the particular user; providing the user profile data as input to a second neural network; executing the second neural network to generate a user profile feature vector; and providing the user profile feature vector as input to the first neural network, wherein the user profile feature vector is combined with a time series feature vector representation at an intermediate layer of the first neural network to generate personalized predictions for the particular user.

10. The non-transitory computer readable storage medium of claim 9, wherein the second neural network comprises a multi-layer architecture configured to encode user profile data including demographic data, health care profile data, and user preferences into the user profile feature vector, and wherein the user profile feature vector is concatenated with the time series feature vector at intermediate layer of the first neural network, to enable the neural network to generate predictions personalized to the characteristics and preferences of the particular user.

11. The non-transitory computer readable storage medium of claim 9, wherein the neural network is an autoencoder.

12. The non-transitory computer readable storage medium of claim 9, wherein the neural network encodes the time series data to the time series feature vector representation, the time series feature vector representation being smaller than the time series data, and decodes the time series feature vector representation to reconstruct the time series data.

13. The non-transitory computer readable storage medium of claim 9, wherein the neural network includes a path that skips a layer, such that an output of a first layer is provided as input to a second layer, wherein there is at least a third layer between the first layer and the second layer.

14. The non-transitory computer readable storage medium of claim 9, wherein the event time series is represented as a binary time series.

15. The non-transitory computer readable storage medium of claim 9, wherein the event time series represents a state of the particular user, the state representing whether the particular user performed a user action.

16. A computer system comprising:

one or more computer processors; and a non-transitory computer readable storage medium storing instructions that when executed by a computer processor, cause the computer processor to perform steps comprising:

receiving training dataset for training a neural network, the training dataset comprising user data for a plurality of users, the user data for a user including a communication time series and an event time series, wherein the communication time series represents communications sent to the user and the event time series represents events associated with the user;

training the neural network comprising, repeatedly:

identifying a user having data stored in the training dataset;

extracting time series data comprising a communication time series and an event time series for the user having data stored in the training dataset;

masking or removing a portion of the time series data;

responsive to masking or removing the portion of the time series data, providing the time series data as input to the neural network;

executing the neural network to predict values of the masked or removed portion of the time series data;

determining a loss value based on the accuracy of the prediction of the masked or removed portion of the time series data; and adjusting parameters of the neural network to minimize the loss value;

executing the trained neural network with time series data for a particular user to predict an event for the particular user in the future;

determining a timing for communicating with the particular user based on the predicted event for the particular user in the future, and wherein the predicted event for the particular user relates to predicted gap days in medication;

sending a communication to the particular user based on the timing for communicating determined based on the predicted gap days for the particular user in the future, the communication informing the particular user to pick up medication;

wherein, during training, the user having data stored in the training dataset is associated with a first event time series representing events associated with the user that occurred in a time interval, and wherein the extracted event time series is a second event time series obtained by masking or removing a portion of the first event time series from an end of the time interval, wherein the input of the neural network further comprises a third event time series representing the portion of the first event time series masked or removed from the end of the time interval; and wherein during training, inputting into the neural network: i) a first communication time series associated with the user having data stored in the training dataset, ii.) the second event time series obtained by masking or removing a portion of the first event time series from an end of the time interval, and iii.) the third event time series representing the portion of the first event time series masked or removed from the end of the time interval, and wherein the neural network is trained to reconstruct the masked or removed portion by minimizing the loss value;

wherein the neural network is a first neural network, the instructions further comprising the steps of: accessing user profile data for the particular user; providing the user profile data as input to a second neural network; executing the second neural network to generate a user profile feature vector; and providing the user profile feature vector as input to the first neural network, wherein the user profile feature vector is combined with a time series feature vector representation at an intermediate layer of the first neural network to generate personalized predictions for the particular user.

17. The computer system of claim 16, wherein the second neural network comprises a multilayer architecture configured to encode user profile data including demographic data, health care profile data, and user preferences into the user profile feature vector, and wherein the user profile feature vector is concatenated with the time series feature vector at intermediate layer of the first neural network, to enable the neural network to generate predictions personalized to the characteristics and preferences of the particular user.

* * * * *